United States Patent

Ando et al.

(10) Patent No.: US 7,503,735 B2
(45) Date of Patent: Mar. 17, 2009

(54) SPINDLE STRUCTURE

(75) Inventors: Tomoharu Ando, Niwa-Gun (JP); Takashi Norihisa, Niwa-Gun (JP)

(73) Assignee: Okuma Corporation, Niwa-gun (JP)

( * ) Notice: Subject to any disclaimer, the term of this patent is extended or adjusted under 35 U.S.C. 154(b) by 0 days.

(21) Appl. No.: 11/940,350

(22) Filed: Nov. 15, 2007

(65) Prior Publication Data

US 2008/0124182 A1 May 29, 2008

(30) Foreign Application Priority Data

Nov. 29, 2006 (JP) .............................. 2006-322411

(51) Int. Cl.
*B23C 9/00* (2006.01)

(52) U.S. Cl. ........................ 409/141; 409/231; 408/143; 74/572.4

(58) Field of Classification Search ................ 409/141, 409/231–233, 234; 408/143, 239 R; 74/572.4, 74/572.2, 572.21
See application file for complete search history.

(56) References Cited

U.S. PATENT DOCUMENTS

| 2,206,941 | A | * | 7/1940 | Cogsdill ...................... 408/143 |
| 5,074,723 | A | * | 12/1991 | Massa et al. ................ 409/141 |
| 5,096,345 | A | * | 3/1992 | Toyomoto ............... 408/239 R |
| 5,125,777 | A | * | 6/1992 | Osawa ........................ 409/234 |
| 6,045,308 | A | * | 4/2000 | Frank et al. .................. 409/234 |
| 6,186,712 | B1 | * | 2/2001 | Senzaki ...................... 408/143 |
| 6,322,299 | B1 | * | 11/2001 | Hartman ..................... 409/141 |
| 6,341,600 | B1 | * | 1/2002 | Wakita .................... 125/13.01 |
| 6,471,453 | B1 | * | 10/2002 | Winebrenner et al. ........ 409/141 |
| 6,557,445 | B1 | * | 5/2003 | Ishikawa ...................... 82/158 |
| 7,258,601 | B2 | * | 8/2007 | Sato ........................... 451/178 |
| 2003/0228199 | A1 | * | 12/2003 | Matsumoto et al. ......... 409/141 |
| 2008/0080942 | A1 | * | 4/2008 | Chen .......................... 409/141 |

FOREIGN PATENT DOCUMENTS

| JP | 05-337769 | A | * | 12/1993 |
| JP | 06-126588 | A | * | 5/1994 |
| JP | 08-174370 | A | * | 7/1996 |
| JP | 2000-218465 | A1 | | 8/2000 |

OTHER PUBLICATIONS

Machine Translation of JP-05-337769-A.*

* cited by examiner

*Primary Examiner*—Erica E Cadugan
(74) *Attorney, Agent, or Firm*—Burr & Brown

(57) ABSTRACT

A spindle structure in which a noise occurrence due to a tap hole and a screw is effectively prevented. A nut for adjusting a preload of a bearing is threadedly engaged with an outer circumference of a spindle. On an edge of the nut, a plurality of tap holes for balance adjustment are provided at even intervals on a circumference centered around the axis of the spindle and to be parallel to the axial direction of the spindle. These tap holes are countersunk, and a plate screw is threadedly engaged so that an edge of each plate screw is flush with a surface of the nut. In addition, the plate screw is used as a balance weight by changing the length thereof.

3 Claims, 2 Drawing Sheets

SPINDLE STRUCTURE

This application claims the benefit of Japanese Patent Application Number 2006-322411 filed on Nov. 29, 2006, the entirety of which is incorporated by reference.

BACKGROUND OF THE INVENTION

1. Field of the Invention

The present invention relates to a spindle structure of a machine tool etc., and more specifically, to a technology to prevent noise which occurs when the spindle rotates at high speed.

2. Description of the Related Art

Generally, a spindle rotating at high speed has a tap hole for balance adjustment on an end surface or has other parts such as a dog for detecting a position mounted by a screw. Thus, when the spindle is rotated, there is a problem in which an external wind noise occurs due to the tap hole and a protruding head of the screw. To solve the problem, as disclosed in Japanese publication of unexamined patent application 2000-218465, a cover for covering the rotating portion, or a lid for covering the tap hole has been used.

However, the noise reduction effect is small even when the rotating portion is covered by a cover. Further, the lid protrudes from an edge of the spindle even when the tap hole is covered with the lid, resulting that external wind noises occur due to the protruded lid. Although the entire spindle is covered, the external wind noise reduction is small if the noise generated by the cover is considered. In other words, it is very difficult to reduce the noise completely.

In view of the above, the object of the present invention is to provide a spindle structure to effectively prevent a noise occurrence by a tap hole and a screw.

SUMMARY OF THE INVENTION

In order to achieve the above, the invention according to a first aspect is characterized by a spindle structure in which a plurality of tap holes are provided with a rotating portion for balance adjustment, wherein each tap hole is countersunk, and a plate screw whose face surface is flush with a surface of the rotating portion when positioned into the tap hole as a balance weight where the length of the plate screw can be changed accordingly.

In addition to the above object, the invention according to a second aspect is characterized by a spindle structure in which additional parts are mounted on a rotating portion by a screw, wherein either a screw hole and a penetrating hole defined in the additional parts is countersunk, and the additional parts are mounted using a plate screw whose face surface is substantially flush with a surface of the additional parts in the mounted state.

It should be noted that "a rotating portion" in this invention includes not only a spindle, but also a draw bar which rotates with the spindle and other components such as a dog for detecting a position.

According to the present invention, the tap hole is covered with the plate screw which does not protrude beyond the surface of the spindle or additional parts. Consequently, when the spindle rotates at high speed, an external wind noise is not generated by the plate screw, so that noise occurrence is effectively prevented.

In particular, a method where countersinking is added to an existing tap hole etc. which is then covered with a flush plate screw, so that additional cost will be kept to a minimum.

DETAILED DESCRIPTION OF THE INVENTION

Herein, an embodiment of the present invention will be explained with reference to the drawings.

Figure 1:
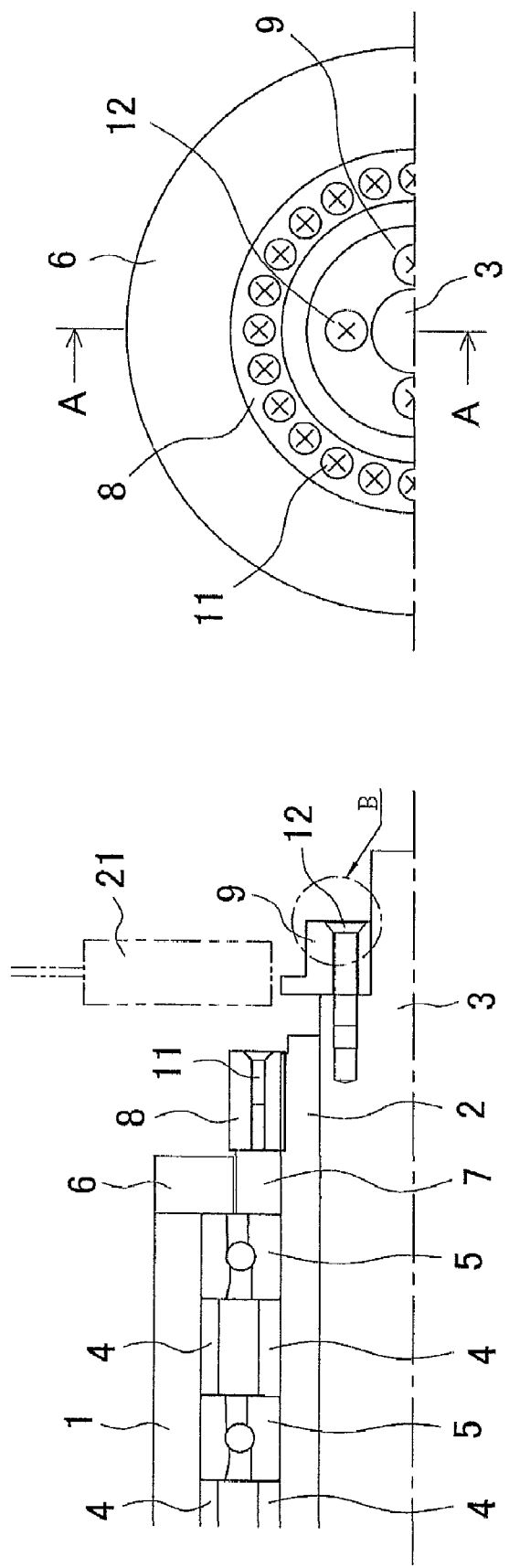
FIG. 1 is an explanation view of a rear portion of a spindle in a machining center.

FIG. 1 is a view of a rear portion of a spindle in a machining center, in which the figure to the right is the front view, and the figure to the left is a sectional view taken along the line A-A. The reference number 1 denotes a housing which supports a spindle 2 that is to be rotatable via a plurality of bearings 5. The reference number 4 is a spacer provided between the bearings 5,5 and the reference number 6 denotes a lid mounted on an edge of the housing 1. A draw bar 3 is assembled into a penetrating hole defined at the center of axis of the spindle 2 so that it is movable in the longitudinal direction. When the draw bar 3 moves in the longitudinal direction by an oil-hydraulic cylinder (not shown), a tool clamping device (not shown) performs a clamp or unclamp operation, so that a tool (not shown) is attachable and detachable to/from the tip of the spindle 2. Moreover, the draw bar 3 has a ring-shaped dog 9 on an edge of the draw bar 3, which allows the position of the draw bar 3 to be detected by a proximity sensor 21 and determines whether or not the tool (not shown) is mounted on the spindle 2.

Figure 2:
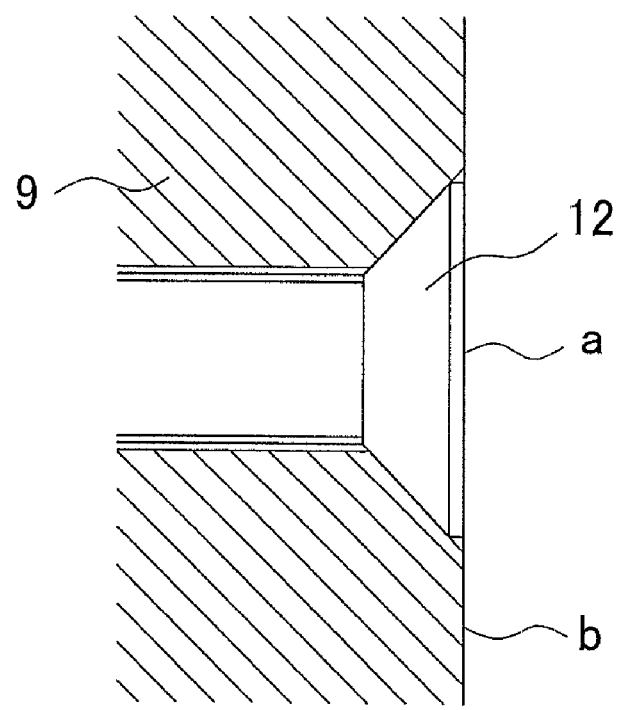
FIG. 2 is a detail view of the portion B of FIG. 1.

As shown in FIG. 2, which is a detail view of the B portion of FIG. 1, the dog 9 has a countersunk screw hole defined at even intervals on a circumference centered around the axis of the draw bar 3 and to be parallel to the axial direction of the draw bar 3. When a plate screw 12 is placed into this countersunk screw hole and it is threaded into the draw bar 3 along its edge, the dog 9 is then assembled to the draw bar 3. In this assembled state, the face surface "a" of the plate screw 12 is essentially flush with surface "b" of the dog 9.

On the other hand, a nut 8 is threaded to the outer circumference of spindle 2, and by adjusting the fastening length of nut 8, the load applied to the bearing 5 can be adjusted via a collar 7. Along the surface of nut 8, a plurality of tap holes for balance adjustment are defined at even intervals on a circumference centered around the axis of spindle 2 and to be parallel to the axial direction of spindle 2. These tap holes are also countersunk, with all tap holes to be filled with a plate screw 11 and threaded to nut 8. Here, similar to FIG. 2, the face surface of each plate screw 11 is flush with the surface of nut 8. In addition, the plate screw 11 is used as a balance weight by changing its length.

In the spindle 2 as configured above, the tap hole of nut 8 is filled with the plate screw 11, and the screw hole of the dog 9 is filled with the plate screw 12, respectively. Moreover, since the plate screws 11, 12 do not protrude beyond the surface of nut 8 and dog 9, an external wind noise does not occur, even when the spindle 2 rotates with the draw bar 3 at a high speed.

In this way, according to a spindle structure in this embodiment, each countersunk tap hole is engaged with the plate screw 11 so that the face surface of the plate screw 11 is flush with a surface of the nut 8 in a fastened state. Here, the length of the plate screw 11 can be changed and the plate screw 11 is then used as a balance weight. In addition, a screw hole defined in the dog 9 is countersunk and the dog 9 is fixed by the plate screw 12 so that the face surface of the plate screw 12 is flush with surface "b" of the dog 9. Thus, wind noise is effectively prevented.

In particular, a method where countersinking is added to an existing tap hole etc. which is then filled with a threaded plate screw so that their face surfaces are flush, so that additional cost can be kept to a minimum.

Although a tap hole for balance adjustment is provided with a nut to be threaded which engages the spindle in the above embodiment, the tap hole may be directly provided on the spindle. Moreover, a screw hole threaded into by a plate screw, in this embodiment, is provided, and in a structure where additional parts, the dog for example, is penetrated by a screw to be threaded into the spindle, a penetrating hole provided with these additional parts may be countersunk.

Moreover, it is not necessary that the face surface of the plate screw should be exactly flush with a surface of the spindle or other parts, and may be slightly protruded or recessed as long as occurrence of an external wind noise is prevented.

In addition, the present invention is not limited to a machining center, and may be applied to other machine tools. In addition to machine tools, the present invention may be applied to any device as long as it uses a spindle which rotates at high speed. Although the present invention discloses a tap hole which is used for balance adjustment and is countersunk to accept a plate screw, and a screw hole and a mating penetration hole to mount additional parts which is countersunk to accept a plate screw, either one or both aspects of this invention may be employed or used.

What is claimed is:

1. A spindle structure for removably clamping a tool, comprising a rotating portion having a plurality of countersunk tap holes formed therein, and a plate screw secured within each respective tap hole so that the face of each plate screw is flush with a surface of the rotating portion into which the tap holes are formed when the plate screws are completely mated with the tap holes, whereby the plate screws are selected from a plurality of plate screws of differing lengths so that the plate screws are used to balance the spindle structure.

2. The spindle structure according to claim 1, wherein the rotating portion includes a part that is removable from the spindle structure, and the countersunk portion of each tap hole is formed in the removable part.

3. The spindle structure according to claim 1, wherein the tap holes are equally spaced circumferentially around the entirety of the rotating portion.

* * * * *